(12) United States Patent
Fartmann et al.

(10) Patent No.: US 8,908,684 B2
(45) Date of Patent: Dec. 9, 2014

(54) METHOD AND COMMUNICATION SYSTEM FOR SELECTING A TRANSMISSION MODE FOR TRANSMITTING PAYLOAD DATA

(75) Inventors: Alfons Fartmann, Garching (DE); Markus Messner, Biedermannsdorf (AT); Jürgen Totzke, Poing (DE)

(73) Assignee: Unify GmbH & Co. KG, Munich (DE)

( * ) Notice: Subject to any disclaimer, the term of this patent is extended or adjusted under 35 U.S.C. 154(b) by 320 days.

(21) Appl. No.: 11/989,823

(22) PCT Filed: Jul. 4, 2006

(86) PCT No.: PCT/EP2006/063853
§ 371 (c)(1),
(2), (4) Date: Jan. 31, 2008

(87) PCT Pub. No.: WO2007/014821
PCT Pub. Date: Feb. 8, 2007

(65) Prior Publication Data
US 2009/0103530 A1    Apr. 23, 2009

(30) Foreign Application Priority Data
Aug. 2, 2005    (DE) .................... 10 2005 036 298

(51) Int. Cl.
| | |
|---|---|
| H04L 12/28 | (2006.01) |
| H04M 7/00 | (2006.01) |
| H04L 12/801 | (2013.01) |
| H04L 29/06 | (2006.01) |
| H04L 12/851 | (2013.01) |
| H04L 12/927 | (2013.01) |
| H04L 12/54 | (2013.01) |
| H04L 12/911 | (2013.01) |

(52) U.S. Cl.
CPC ............. *H04L 47/24* (2013.01); *H04M 7/0072* (2013.01); *H04L 47/15* (2013.01); *H04L 65/80* (2013.01); *H04L 47/801* (2013.01); *H04L 65/1069* (2013.01); *H04L 12/5695* (2013.01); *H04L 47/805* (2013.01); *H04L 47/781* (2013.01)
USPC ........ 370/389; 370/252; 370/395.2; 709/227; 709/228

(58) Field of Classification Search
None
See application file for complete search history.

(56) References Cited

U.S. PATENT DOCUMENTS 6,597,702 B1   7/2003  Caugherty
6,671,367 B1   12/2003 Graf et al.
(Continued)

FOREIGN PATENT DOCUMENTS

| EP | 1158445 A1 * | 11/2001 | ............. G06F 17/60 |
|---|---|---|---|
| EP | 1307036 A1 | 5/2003 | |
| WO | 2005003884 A2 | 1/2005 | |

*Primary Examiner* — Nicholas Sloms
(74) *Attorney, Agent, or Firm* — Buchanan Ingersoll & Rooney PC

(57) ABSTRACT

A transmission mode selection for packet-oriented transmission of useful data between a first and a second communication device is provided, where lists of transmission modes for the communication devices are transmitted to a quality-of-service device. The quality-of-service device uses available transmission resources to select one or more transmission modes from the lists such that the quality of service, which is dependent on the selected transmission modes, can be assured by the available transmission resources. The selected transmission modes are transmitted to a connection controller which prompts further selection of a transmission mode from the transmission modes for the communication devices. The useful data are then transmitted between the communication devices using the transmission mode selected by the further selection.

14 Claims, 3 Drawing Sheets

(56) References Cited

U.S. PATENT DOCUMENTS

| | | |
|---|---|---|
| 2003/0123388 A1 | 7/2003 | Bradd |
| 2004/0109414 A1 | 6/2004 | Choi et al. |
| 2004/0139088 A1 | 7/2004 | Mandato et al. |
| 2005/0013309 A1* | 1/2005 | Ravishankar et al. ........ 370/401 |
| 2005/0105486 A1* | 5/2005 | Robinett et al. .............. 370/321 |

* cited by examiner

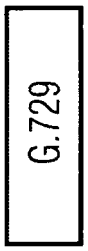
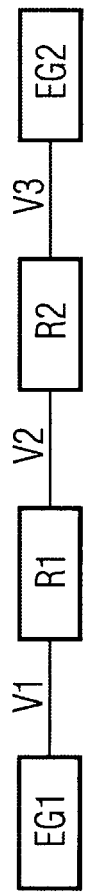

METHOD AND COMMUNICATION SYSTEM FOR SELECTING A TRANSMISSION MODE FOR TRANSMITTING PAYLOAD DATA

CROSS REFERENCE TO RELATED APPLICATIONS

This application is the US National Stage of International Application No. PCT/EP2006/063853, filed Jul. 4, 2006 and claims the benefit thereof. The International Application claims the benefits of German application No. 102005036298.2 DE filed Aug. 2, 2005, both of the applications are incorporated by reference herein in their entirety.

FIELD OF INVENTION

The present invention relates to a method and communication system for selecting a transmission mode for transmitting payload data.

BACKGROUND OF INVENTION

In order to transmit payload data in packet-oriented networks, different parameters relating to the transmission are typically negotiated between the communication partners of a payload data link as part of a signaling exchange. Said parameters are referred to below as transmission modes and specify e.g. a codec used for encoding and decoding the payload data.

In this case the transmission modes for the payload data transmission are negotiated such that a communication can take place between the communication partners. For example, mutually compatible codecs or codecs which are supported by both partners are selected by the communication partners. By means of these compatible codecs a payload data link can be set up between the communication partners, while at the same time the choice of codecs used in particular can have an effect on the quality of the payload data transmission and on the bandwidth used for the payload data transmission.

In a packet-oriented network, link sections can make different bandwidth resources available in each case. For example, a packet-oriented voice connection of a teleworker to a terminal device in a LAN (Local Area Network) can be routed via a narrowband telephone line of a public telephone network to a gateway in the LAN and from there forwarded via broadband to the terminal device. In many communication systems it often happens that if a non-compressing codec is selected a connection cannot be set up via the narrowband link section since insufficient bandwidth is available for a payload data link encoded using this codec, whereas if a compressing codec is chosen for the payload data link sufficient bandwidth would still have been available.

Often also, a codec which is highly compressing is chosen for the payload data link and consequently only delivers a reduced payload data quality, even though the network makes a sufficiently high bandwidth available which would have allowed the use of a low-compression codec with better payload data quality.

The selection of the codecs and other transmission modes for a payload data transmission is in this case often made by the endpoints of the connection and is often configured in these. In this case the configuration—e.g. which codecs are used—can be performed on a cross-network or network-area-specific basis.

The U.S. Pat. No. 6,671,367 B1 discloses a method wherein a prioritized list of preferences is transmitted from an originating signaling endpoint to what is termed a Media Gateway Controller, said list being modified by the Media Gateway Controller in such a way that elements which are not supported by an associated Media Gateway are removed and this modified list is transmitted to the Media Gateway.

SUMMARY OF INVENTION

The object of the invention is to specify a method for selecting a transmission mode' for transmitting payload data, which method enables dynamic and/or static limiting factors of the network to be taken into account during the selection in order thereby to make an improved selection. A further object of the invention is to specify a communication system for performing the method.

This object is achieved by a method as well as a communication system as claimed in the independent claims. Advantageous embodiments and developments of the invention are set forth in the dependent claims.

In the inventive method for selecting a transmission mode' for transmitting payload data between a first and a second communication device, in particular a terminal device such as an IP telephone (IP: Internet Protocol), a multimedia application or a so-called soft client with telephony functions on a computer, over a packet-oriented communication network, a first list of transmission modes of the first communication device and a second list of transmission modes of the second communication device are transmitted, in particular in the course of a connection setup, to a quality-of-service device. A quality of service of the transmission is dependent here on the respective transmission mode. A transmission mode can be determined in particular by a codec type, a number of payload data sample values or payload data segments per payload data packet, the type and/or presence of encryption, an IP standard used (at the time of the patent application, IP Version 4 or IP Version 6), a size of payload data packets, and/or a number of payload data packets per time unit. Based on available transmission resources of the communication network, the quality-of-service device selects one or more transmission modes from the first and second lists such that the quality of service dependent on the selected transmission modes can be guaranteed by the available transmission resources. In addition, the quality-of-service device transmits the selected transmission modes to a data link control. The data link control, in particular a network node or an active switching component in the signaling path, a gateway, a gatekeeper or even the first or second communication device, initiates a further selection of a transmission mode' from the transmitted transmission modes for the communication devices. The transmission of the payload data, in particular via a direct payload data link, between the communication devices is performed using the transmission mode' selected by means of the further selection.

In this context, what is understood by available transmission resources can be in particular a bandwidth upper limit of link sections of the payload data link, a current capacity utilization of link sections, a statistical or historical capacity utilization of link sections taking into consideration the network based on topology information. Topology information is understood to mean in particular the structure of the network and maximum bandwidths or capacity upper limits of respective link sections. Topology information can also, for example, specify limiting the number of voice connections that can be conducted in parallel over a narrowband subscriber line to a small value such as one or two, or setting an upper limit for a multimedia application to 128 kbit/s in order to allow other data transmissions on the network in addition to the voice connections.

The inventive communication system for selecting a transmission mode' for transmitting payload data between a first and a second communication device over a packet-oriented communication network, wherein a quality of service of the transmission is dependent on the respective transmission mode, includes a quality-of-service device for receiving a first list of transmission modes of the first communication device and a second list of transmission modes of the second communication device. Also provided is the quality-of-service device for selecting one or more transmission modes from the first and second lists, with the selection being made on the basis of available transmission resources of the communication network such that the quality of service dependent on the selected transmission modes can be guaranteed by the available transmission resources. Furthermore, the quality-of-service device is provided for transmitting the selected transmission modes to a data link control. The inventive communication system additionally includes the data link control for initiating a further selection of a transmission mode' from the transmission modes transmitted by the quality-of-service device for the communication devices, and a transmission device for transmitting the payload data between the communication devices using the transmission mode' selected by means of the further selection.

The invention is advantageous insofar as the quality-of-service device can take into account comprehensive static and dynamic information of the network during the selection of the transmission modes, which information is usually not available to the first or second communication device. This permits a better selection of the transmission modes that is matched to actual conditions. It also proves advantageous that an otherwise customary configuration of the communication devices with regard to selection of the transmission modes is made easier or can even be dispensed with. This results in increased flexibility and simplifies the administration of the network. A further advantage is the enabling of a bandwidth-optimized payload data transmission, which is characterized in that a use of bandwidth resources can be optimized, taking into account a requirement in terms of the quality of the payload data and/or the payload data transmission and taking into account resource upper limits.

It is also advantageous that the topology of the network can be taken into consideration during the selection of the transmission modes and hence the transmission resources of link sections of the network can be taken into account. In this case it is possible to map the topology of the network in a different granularity and—depending on requirements—administer link sections separately or in groups and evaluate them within the scope of the invention. Thus, for example, subnetworks of the network can be considered by the quality-of-service device as a single entity with the same transmission resources.

It is also advantageous that an overdimensioning of the network due to the provisioning of disproportionately large transmission resources can be dispensed with. Alternatively and/or in addition, the quality-of-service device enables the utilization of the network's capacity to be optimized.

The subdivision of the selection of the transmission modes into a preselection by the quality-of-service device and a subsequent final selection initiated by the data link control is advantageous insofar as, for example, the quality-of-service device only evaluates cross-subnetwork topology information during the preselection, whereas subnetwork-internal criteria are evaluated in the final selection. This two-stage process reduces in particular the complexity of the evaluation of the selection of the transmission modes.

Furthermore, in an advantageous development of the invention it is even possible to apply a three-stage method wherein the quality-of-service device carries out a preselection of the transmission modes, the data link control itself makes a subsequent selection of the transmission modes, and yet the final selection of the transmission modes, initiated by the data link control, is performed by the communication devices.

In an advantageous development of the invention it is possible, during the selection of the transmission modes by the quality-of-service device, to perform a transmission-mode-specific quality-of-service comparison and/or bandwidth comparison, the bandwidth comparison representing a comparison of a required bandwidth with an available bandwidth. Analogously, the quality-of-service comparison represents a comparison of a desired quality of service with an available quality of service. Based on the selection of the transmission modes, a quality-of-service/bandwidth reservation can be made.

A bandwidth comparison or test of this kind can determine in particular a currently available maximum bandwidth and compare this with a minimum required bandwidth resulting according to the possible transmission mode, contained in the first and second lists. This is advantageous to the extent that bandwidth reservations made for already established connections can be stored in the quality-of-service device and hence be used in a following evaluation and selection of transmission modes.

The bandwidth reservation can be made for one of the transmission modes selected by the quality-of-service device, preferably what is termed a "worst case" method being applied to reserve that bandwidth which requires the highest bandwidth out of the entries. In this case the bandwidth reservation can be performed separately for individual link sections.

Preferably the selection of the transmission modes and the bandwidth reservation can be performed by the quality-of-service device in a single transaction in order thereby to avoid overlaps with contending reservations in the time window between transmission mode selection and reservation. In this case the data link control addresses a single request to the quality-of-service device containing all the relevant information about the transmission modes of the two communication devices. The quality-of-service device responds with the list of selected transmission modes.

In a development of the invention, the transmission mode selected during the further selection can be communicated to the quality-of-service device. Preferably this happens following final selection of the transmission mode' and before an end-to-end setup of the payload data transmission. Depending on the selected transmission mode, the quality-of-service device can perform a bandwidth reservation or update a previously completed bandwidth reservation. This is advantageous to the extent that in this way the precisely used bandwidths are now made known to the quality-of-service device and these values can be used for evaluations of succeeding method sequences for further payload data links.

Preferably a bandwidth of the payload data link can also be set up according to the reserved bandwidth during the setup of a payload data link for transmission of the payload data. In addition, upon termination of the payload data link, the bandwidths set up and the bandwidths reserved in the quality-of-service device can be released again. The latter can preferably take place as a result of a notification message from one of the communication devices or the data link control to the quality-of-service device.

In an advantageous embodiment of the invention, the quality-of-service device can select the one transmission mode or the plurality of transmission modes from the first and second lists such that both communication partners support the transmission modes.

In a further advantageous embodiment of the invention, the transmission modes of a bi-directional connection can be determined and selected separately for each transmission direction.

BRIEF DESCRIPTION OF THE DRAWINGS

An exemplary embodiment of the invention is explained below with reference to the drawing, in which.

DETAILED DESCRIPTION OF INVENTION

Figure 1:
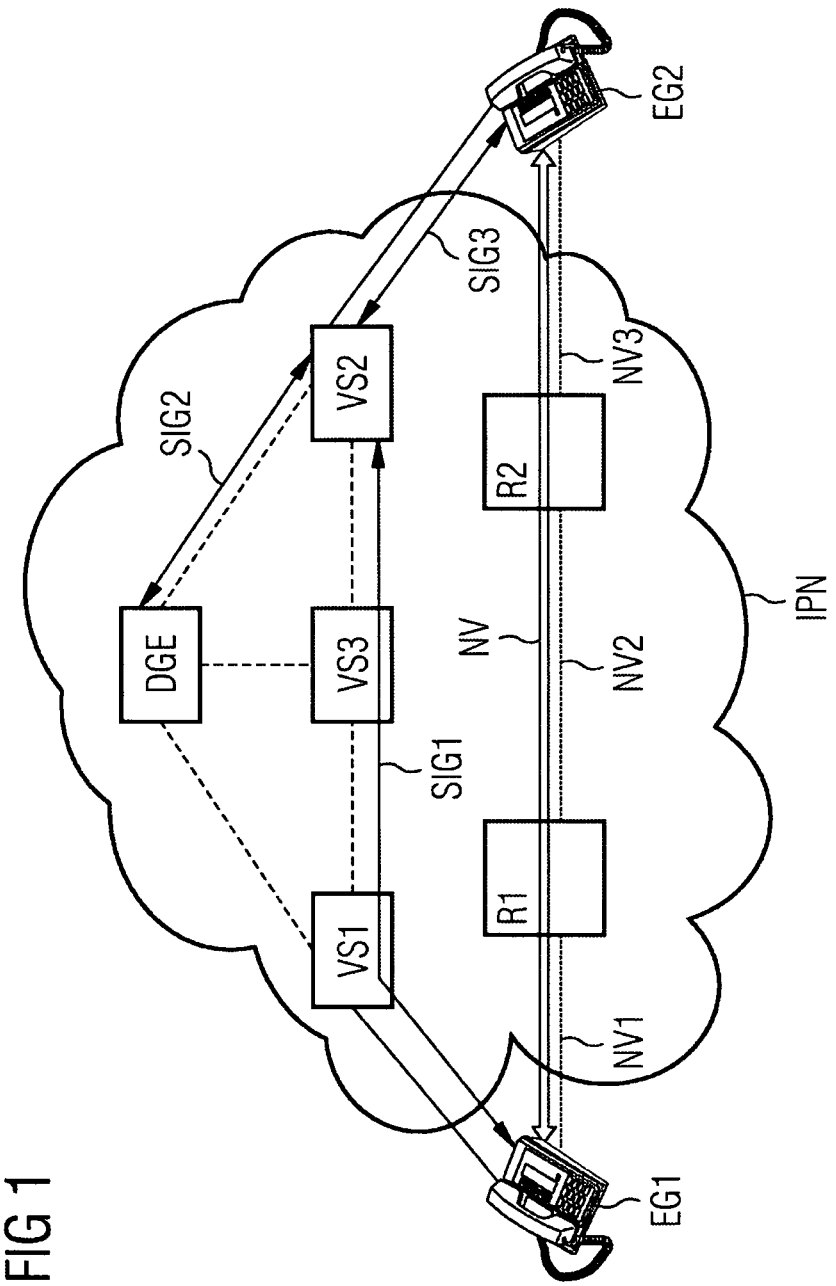
FIGS. 1-2 show in a schematic representation a communication system with two IP telephones connected to each other via data link controls and FIG. 3 schematically illustrates transmitted transmission modes and transmission resources of a subnetwork of the communication system.
Figure 2:
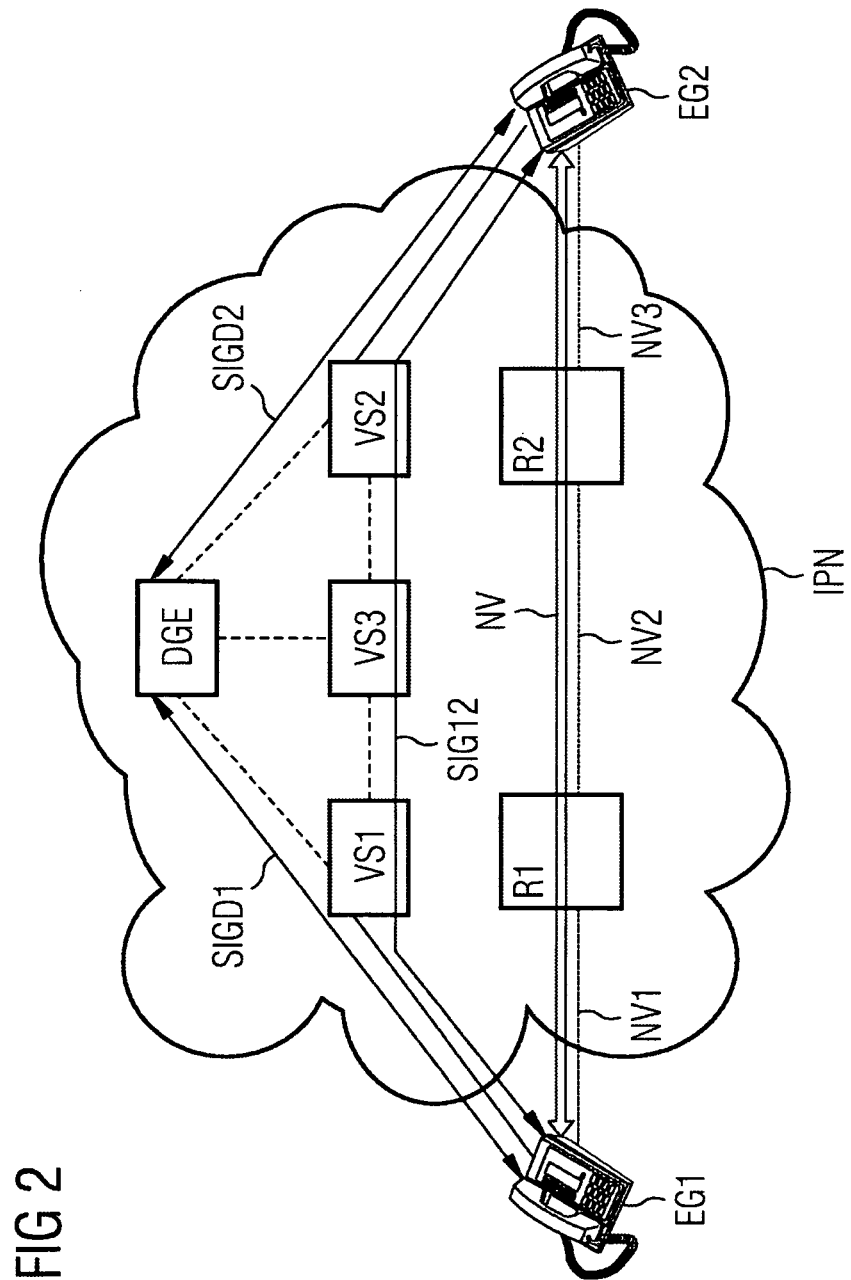

FIGS. 1-2 show in a schematic representation a communication system with two IP telephones EG1, EG2 as first (EG1) and second (EG2) communication devices, three data link controls VS1, VS2, VS3, and a quality-of-service device DGE. All these cited components can communicate with one another via an IP network IPN, as indicated by means of dashed lines between these components. In this scheme let the first IP telephone EG1 be assigned to the first data link control VS1, and the second IP telephone EG2 to the second data link control VS2, these assignments being represented by an unbroken line between the respective components and e.g. having been set up by means of a prior configuration of the data link controls VS1, VS2 and/or the IP telephones EG1, EG2.

Signaling links SIG1, SIG2, SIG3, SIGD1, SIGD2, SIG12 are represented as single continuous double arrow lines, while a payload data link NV is represented as a double continuous double arrow line. In the present exemplary embodiment, let payload data be voice data between the two IP telephones EG1, EG2. A path of the payload data link from the first IP telephone EG1 to a first router R1 via the first path section NV1, via a second path section NV2 to a second router R2 and from there via a third path section NV3 to the second IP telephone EG2 is represented by means of a dotted line. In this case let payload data traffic be routed via the two routers R1, R2, without the two routers R1, R2 encoding and/or decoding the payload data. Let it be assumed that the payload data is encoded and/or decoded solely in the two IP telephones EG1, EG2. A connection of this kind is usually referred to as a direct payload data link or direct payload between the communication devices.

Real-time requirements need to be taken into account for the transmission of the voice data, e.g. in accordance with the IP telephony technologies H.323 and SIP (Session Initiation Protocol). The so-called Real-Time Transport Protocol (RTP) is often used as the protocol for transmitting the voice data, serving in particular to transport multimedia data streams (audio, video, text, etc.) over packet-oriented networks. The payload data is encoded for transport—often in a lossy manner due to compression of the payload data—and transmitted in data packets.

FIG. 1 schematically shows a connection setup for a transmission of payload data with real-time requirements, wherein a selection of a transmission mode' for the two IP telephones EG1, EG2 is made by the quality-of-service device DGE.

The first IP telephone EG1 initiates a call to the second IP telephone EG2. In the course of a thereby beginning connection setup signaling, the supported transmission modes of the first IP telephone EG1 are transmitted to the second data link control VS2 in the signaling link SIG1. In the present exemplary embodiment let the transmission modes be specified by the supported codecs of the first IP telephone EG1, parameters for the voice sample values per payload data packet and the type of encryption of the payload data. The second data link control VS2 now interrupts the further signaling to the second IP telephone EG2 in such a way that in this method step the signaling to the second IP telephone EG2 is held back and no message relating to the call setup is transmitted to the second IP telephone EG2 or only a message is transmitted without the supported transmission modes of the first IP telephone EG1.

The second data link control VS2 also generates a first list of the transmission utilization modes supported by the first IP telephone EG1. In addition, the second data link control VS2 generates a second list of the transmission modes supported by the second IP telephone EG2, said last-mentioned transmission modes of the second data link control VS2 having been made known on account of a registration of the second IP telephone EG2 with the second data link control VS2 or having been queried by means of message traffic in the course of the previous or current connection setup.

The second data link control VS2 now deletes from the two lists those transmission modes which are not supported by the communication partners and which at selection time would therefore not allow a successful payload data transmission and would consequently not be selected by the quality-of-service device DGE in any case.

Considered generally, in an alternative embodiment a single list can be generated in this step from the transmission modes supported by the two IP telephones EG1, EG2, with only this one list needing to be handled in the further course of the connection.

The two lists, possibly after the aforesaid modification of the lists, are now transmitted to the quality-of-service device DGE within the signaling link SIG2.

In FIG. 1, the quality-of-service device DGE is embodied as a server which, with the aid of topology and capacity utilization information, selects one or more transmission modes from the first and second lists such that predefined or predefinable criteria are satisfied. One criterion here is that a direct payload data transmission is made possible between the first (EG1) and second IP telephone EG2. A second criterion is that a predefined transmission resource, e.g. a bandwidth on a link section of the payload data link, is not exceeded. The selection of codecs and packet rates for the payload data transmission also has an impact on the available transmission resources. A third criterion here can be that a quality of service including the voice quality and a voice delay can be guaranteed. A fourth criterion can be restrictive information relating to link sections which, for example, prevent the transmission of data according to a certain protocol on the respective link section.

To evaluate said criteria, the quality-of-service device DGE can access topology information concerning the structure of the IP network IPN and concerning current and statistical capacity utilization information relating to link sections within this IP network IPN. This information can be stored in a database, in which case the data in the database can be configured—e.g. via XML configuration files (XML: Extensible Markup Language)—, can be queried by a further server, or can be ascertained by means of test messages.

On the basis of the first and second lists and available transmission resources of the IP network IPN, the quality-of-service device DGE now selects one or more transmission modes from the first and second lists such that the quality of service dependent on the selected transmission modes can be guaranteed by the available transmission resources. According to the embodiment of the quality-of-service device DGE, the latter now returns a common list for the two lists or a modified list for each of the two lists to the second data link control VS2 via the signaling link SIG2.

In a special case (not shown) the lists created by the quality-of-service device DGE are empty and no transmission modes can be selected. No communication is possible between the IP telephones EG1, EG2. This is communicated in subsequent method steps to the IP telephones EG1, EG2 by means of signaling messages. This can usually be omitted for the second IP telephone EG2, because the latter has not initiated a connection setup.

In a further case to be considered in particular, only a single transmission mode per transmission direction is transmitted to the second data link control VS2. This can be the case in particular when only one transmission mode could be found or if the quality-of-service device DGE has been instructed to return, per transmission direction, only that transmission mode which can best satisfy the examined criteria. This selected transmission mode is then transmitted to the two IP telephones EG1, EG2 via the signaling links SIG1 and SIG3, whereupon a payload data link NV can be set up using the selected transmission modes.

In a more general description, the quality-of-service device DGE can transmit two restricted lists, each containing at least one entry, to the second data link control VS2. The latter can now make a further selection in the lists based on further criteria and thereby further restrict the lists or process the lists further in unmodified form.

Subsequently, the connection setup message held back up to this method step is forwarded by the second data link control VS2 to the second IP telephone EG2 in the course of the signaling SIG3, the contents of the second, restricted list being included in the signaling message. A list of permitted codecs or codecs preferred for selection is thus transmitted to the second IP telephone EG2.

By means of this modified signaling SIG3, the second data link control VS2 causes the called, second IP telephone EG2 to make a selection of precisely one transmission mode' per transmission direction from the modified second list. Similarly, the second data link control VS2 effects the transmission of the restricted first list to the first IP telephone EG1 in the course of the signaling SIG1 and causes said calling, first IP telephone EG1 to select precisely one transmission mode' from the first list.

In this case the two IP telephones EG1, EG2 select the transmission mode on the basis of configured rules. Following the selection of the transmission modes in the two IP telephones EG1, EG2, the payload data link NV can be set up between the first IP telephone EG1 and the second IP telephone EG2, with the selected transmission modes being used by the two IP telephones EG1, EG2 as inventive transmission devices during the encoding/decoding and the sending/receiving of the payload data. In particular, a selected codec is used for encoding and/or decoding, the packets are sent and/or received at a selected data packet rate, and the packets are encrypted using the selected type of encryption.

In the exemplary embodiment, a direct payload data link NV—routed via the routers R1 and R2—is thus enabled between the two IP telephones EG1, EG2, while at the same time a quality of service of the voice transmission dependent on the respective transmission mode can be optimized such that topology information and capacity utilization information are taken into account.

Considered generally, the quality-of-service device DGE can be a rule-based system during the processing of the two lists or process the criteria on the basis of specifications or rules, referred to as policies. These are, for example, restrictions per link section, per payload data type to be transmitted (voice, multimedia, etc.) or per defined or specified capacity utilization threshold values.

The restricted lists which the quality-of-service device DGE transmits to the second data link control VS2 can include priorities for the subsequent final selection of the transmission modes. In this case the individual list elements can be assigned priority levels or the order of the elements in the list reflects a priority of the elements. In this way it can be communicated to the second data link control VS2 which of the transmission modes are to be selected by preference based on the check by the quality-of-service device DGE.

Advantageously, the quality-of-service device DGE also includes a functionality for querying the currently available transmission resources, in particular the bandwidths, in the IP network IPN. This enables the selection of the transmission modes to be based on the current capacity utilization of the IP network IPN. A bandwidth reservation can also be made by the quality-of-service device DGE, which reservation can then be taken into account during the selection of the transmission modes, since a required bandwidth for the payload data can be determined for an examined transmission mode and compared with the bandwidth that is available. In this case the bandwidth reservation can be based on a worst-case approach, wherein following the selection of a plurality of transmission modes that bandwidth is reserved for the restricted first and second lists which is the largest out of all the transmission modes in the lists. In the final selection of the transmission modes in the second data link control VS2 or in the two IP telephones EG1, EG2, this bandwidth reservation can then be updated in accordance with the bandwidth actually used. Furthermore, what is referred to as a release request can be transmitted to the quality-of-service device DGE following termination of the call, in order to release the reserved bandwidth.

The method presented thus far in a protocol-neutral manner will be explained once again below with reference to a use of H.323 or SIP for the signaling. Thus, in the case of H.323, for example, what is termed the SETUP message can be used within the signaling link SIG1 for the transmission of the transmission modes supported by the first IP telephone EG1, the transmission modes being transmitted in an H.245 Container message. The transmission modes of the called, second IP telephone EG2 can either be requested from the second IP telephone EG2 by the second data link control VS2 by means of a proprietary message, be configured in the second data link control VS2, or be taken from a preceding H.323 signaling message.

Upon arrival of the SETUP message at the second data link control VS2, said message is temporarily detained in the second data link control VS2 and the transmission modes contained therein are extracted from the message and transmitted to the quality-of-service device DGE. After reception of a response from the quality-of-service device DGE as part of the signaling SIG2 with the modified first and second lists, the SETUP message is modified by the second data link control VS2 in such a way that only the transmission modes satisfying the criteria remain contained in the SETUP message. This modified SETUP message is then transmitted to the called, second IP telephone EG2. All further steps for the connection setup are then continued in accordance with standard connection setup methods.

When SIP is used for the signaling, what is termed an INVITE message is transmitted by the calling, first IP telephone EG1 to the second data link control VS2, the transmission modes supported by the first IP telephone EG1 being transmitted in an SDP Container message (SDP: Session Description Protocol). The second data link control VS2 can query the called, second IP telephone EG2 for its supported transmission modes by means of what is termed an OPTIONS request, the transmission modes can be configured in the second data link control VS2, or they can be taken from the so-called SIP Precondition Handling in accordance with RFC3312. The further method steps are then analogous to H.323, i.e. the INVITE message is held back and the transmission modes contained therein are transmitted with modifications, determined by the quality-of-service device DGE, to the called, second IP telephone EG2.

FIG. 2 schematically depicts method steps in a communication system in which the two IP telephones EG1, EG2 directly transmit the lists of their supported transmission modes to the quality-of-service controller DGE. In this case let the inventive data link control be part of the first and/or second IP telephone EG1, EG2. When a voice connection is initiated, the first IP telephone EG1 transmits a message SIGD1 containing its supported transmission modes and an identifier of the first IP telephone EG1 to the quality-of-service device DGE. The identifier permits a unique identification of the first IP telephone EG1 and can be e.g. the IP address of the first IP telephone EG1. In the further course of the signaling, the second IP telephone EG2 uses the signaling message SIGD2 to send its own list of transmission modes and the identifier of the first IP telephone EG1 to the quality-of-service controller DGE which, on the basis of the identifier, performs the assignment of the two IP telephones EG1, EG2 that are to be connected.

Analogously to the previously described method steps, the quality-of-service device DGE now determines a restricted selection of transmission modes and transmits this to the second IP telephone EG2. The latter now selects a transmission mode therefrom and transmits this within the signaling link SIG12 to the first IP telephone EG1. Alternatively, the transmission mode can be selected exclusively via the signaling link SIGD2. In this case the second IP telephone EG2 receives the list from the first IP telephone EG1 and can contact the quality-of-service device, at the same time contributing its own list.

FIG. 3 illustrates the transmitted transmission modes and the transmission resources of a subnetwork with the aid of the signaling SIG1, SIG2, SIG3 according to FIG. 1. A list of transmission modes shown in FIGS. 3a, 3b, 3c and 3e is in this case represented by means of a rectangle subdivided into sections. The topology of a subnetwork for the payload data link between the first IP telephone EG1 and the second IP telephone EG2 via the routers R1 and R2 is represented by means of rectangles for the IP telephones EG1, EG2 and for the routers R1, R2, as well as by means of unbroken lines for link sections V1, V2, V3 between the IP telephones EG1, EG2 and routers R1, R2 (FIG. 3d). The available transmission resources for each of the link sections are shown in FIG. 3d as comma-separated lists. Only codecs are considered as transmission modes in FIG. 3. Other transmission modes are handled in a similar manner, but for reasons of clarity are not shown. Furthermore, the example relates only to the transmission direction from the first IP telephone EG1 to the second IP telephone EG2. The opposite direction is to be regarded analogously and is therefore not described.

FIG. 3a shows the first list of codecs supported by the first IP telephone EG1, which list is transmitted to the second data link control VS2 within the signaling link SIG1. Let the supported codecs of the first IP telephone EG1 be the codecs G.711, G.722, G.723.1, G.729, G.729AB.

FIG. 3b shows the second list of codecs supported by the second IP telephone EG2, which list is transmitted to the second data link control VS2 within the signaling link SIG3, or the codecs are known owing to a registration or configuration. Let the supported codecs of the second IP telephone EG2 be the codecs G.711, G.722, G.726, G.729, G.729AB.

The second data link control now transmits these two lists to the quality-of-service device DGE within the signaling link SIG2. The two transmitted lists are shown in FIG. 3c and include the aforementioned codecs.

The quality-of-service device DGE now makes a selection of the transmission modes by evaluating topology information of the network and taking into account bandwidth and codec parameters for the link sections V1, V2, V3. The topology to be evaluated and the parameters are shown in FIG. 3d. It is shown here that the payload data link NV to be set up is routed from the first IP telephone EG1 via the link section V1 to the router R1, from the router R1 via the link section V2 to the router R2, and from the router R2 via the link section V3 to the second IP telephone EG2. Based on a current capacity utilization of the link sections and based on topology restrictions—e.g. the link section V1 could be a narrowband telephone subscriber line and the link section V2 a broadband LAN connection, with, though, already assigned transmission resources for simultaneously active connections needing to be taken into account in each case—the quality-of-service device DGE establishes that a connection setup using the codecs G.723.1 and G.729 is possible via the link section V1, a connection setup using the codecs G.711, G.722, G.728 and G.729 is possible via the link section V2, and a connection setup using the codecs G.711, G.722 G.729 and G.726 is possible via the link section V3. In order to perform the transmission of the payload data over all three link sections V1, V2, V3, the quality-of-service device DGE recognizes that for voice encoding only the codec G.729 supports an end-to-end connection. The quality-of-service device DGE thereupon modifies the two lists in such a way that a common list of codecs supported jointly by the two IP telephones EG1, EG2 is created which only contains the codec G.729. This common, restricted list—shown in FIG. 3e—which contains a selection from the first and second lists, is now transmitted via the signaling link SIG2 to the second data link control VS2 and thus includes only codecs which are supported by both IP telephones EG1, EG2.

With the selected codec G.729, the second data link control VS2 can now initiate the payload data transmission NV for the voice connection.

Further embodiments of the invention that are not shown can provide that in order to create the first and/or second list the second data link control VS2 determines the transmission modes of the first and/or second communication device (EG1, EG2) from a connection setup signaling—for example the signaling link SIG1—for the transmission of the payload data, from a preceding signaling, from a registration of the first and/or second communication device (EG1, EG2) with the second data link control VS2, and/or a configuration of the second data link control VS2. The last-mentioned options in particular enable the lists to be sent to the quality-of-service device DGE to be generated without querying the communication device (EG1, EG2) and therefore without delay.

In a further embodiment of the invention that is not shown, the payload data can be transmitted in a media stream, in which case the transmission modes that are incompatible with the media stream can be omitted from the lists to be transmitted to the quality-of-service device.

As an alternative to the previously explained exemplary embodiment, the method sequence can also be modified such that, provided—as in the present exemplary embodiment—the second communication device is a terminal device, the first communication device transmits the first list of transmission modes to the data link control by means of a signaling message intended for the second communication device, the data link control stores the first list and transmits the signaling message to the second communication device, and the second communication device suppresses a visual and/or acoustic signaling, e.g. in the form of a ringtone, that is usual as part of a connection setup. The data link control can also transmit the first and second lists to the quality-of-service device and, after receiving the selected transmission modes from the quality-of-service device, the data link control can again transmit a signaling message to the second communication device, in which case only the transmission modes selected by the quality-of-service device or parts of the selected transmission modes can be contained in the signaling message. In this case the reception of this signaling message can cause the second communication device to output the visual and/or acoustic signaling.

In a further alternative method sequence, the first communication device transmits the first list of transmission modes to the data link control by means of a signaling message intended for the second communication device and the data link control forwards the signaling message to the second communication device. In addition, the second communication device transmits the second list of transmission modes to the data link control in a response message, whereupon the data link control transmits the first and second lists to the quality-of-service device. Later, after receiving the transmission modes selected by the quality-of-service device, the data link control transmits to the first and second communication device a further signaling message containing in each case the transmission modes selected by the quality-of-service device or parts of the selected transmission modes.

The method steps presented can be used in particular with network protocols QSIG (signaling at the Q reference point) via SIP, QSIG via H.323 (Annex M.1), with H.323 (Annex M.1) defining the tunneling of signaling protocols via H.323, for the overall connection or for the partial connections of transit sections. Furthermore, the method can be used with ISUP (ISDN User Part) via SIP, ISUP via H.323, DSS1 (Digital Subscriber Signalling System No. 1) via SIP, DSS1 via H.323, as well as for H.323 for IP Centrex solutions.

The invention claimed is:

1. A method for selecting a transmission mode for transmitting payload data between a first communication device and a second communication device over a packet-oriented communication network, wherein a quality-of-service of the transmission is dependent on the respective transmission mode, the method comprising:

transmitting a first list of transmission modes and a second list of transmission modes to a quality-of-service device that is not either of the first and second communication devices, the first list of transmission modes supported by the first communication device, and the second list of transmission modes supported by the second communication device, the second list generated independently of the first list;

selecting at least one transmission mode from the first and second lists by the quality-of-service device based on available transmission resources of the communication network such that the quality of service dependent on the selected at least one transmission mode is guaranteed by the available transmission resources;

transmitting the selected at least one transmission mode from the quality-of-service device to a data link control, the data link control not being one of the first and second communication devices, not being a component of either of the first and second communication devices, not being a component of the quality-of-service device, and not being the quality-of-service device;

initiating a further selection of a transmission mode by the data link control, the further selection based on the selected at least one transmission mode transmitted to the data link control; and the data link control transmitting the further selected transmission mode to the quality-of-service device prior to a start of the transmitting of the payload data between the first and second communication devices using the transmission mode selected in the further selection, requesting, by the quality-of-service device, a bandwidth reservation in accordance with the further selected transmission mode;

transmitting the payload data between the first and second communication devices using the transmission mode selected in the further selection; and wherein the at least one transmission mode selected by the quality-of-service device is supported by both the first and second communication devices, and wherein the further selection initiated by the data link control comprises the data link control performing the further selection of the transmission mode by communicating the further selection of the transmission mode by the data link control to the first and second communication devices such that the transmitting of the payload data between the first and second communication devices using the transmission mode selected in the further selection is performed without the data link control querying the first and second communication devices to make the further selection.

2. The method as claimed in claim 1, wherein a preselection is made for the first and second lists to be transmitted such that the first and second lists include only transmission modes that are supported by both the first and second communication devices and that the first and second lists are created from the preselected transmission modes.

3. The method as claimed in claim 1, wherein to create at least one of the lists, the transmission modes are determined from at least once condition selected from the group consisting of a connection setup signaling for the transmission of the payload data, a preceding signaling, a registration of the communication device of the list with the data link control, and a configuration of the data link control.

4. The method as claimed in claim 1, wherein when a plurality of transmission modes are selected by the quality-of-service device, each selected mode is assigned a different priority level to provide a recommendation for the further selection.

5. The method as claimed in claim 1, wherein during the selection of the at least one transmission mode by the quality-of-service device: a transmission-mode-specific comparison of a required bandwidth with an available bandwidth is performed, and a bandwidth reservation is made based on the selection.

6. The method as claimed in claim 5, wherein the comparison of a required bandwidth with an available bandwidth is performed as part of a call acceptance check.

7. The method as claimed in claim 1, further comprising:
the data link control transmitting the further selected transmission mode to the quality-of-service device, and updating, by the quality-of-service device, a previous bandwidth reservation in accordance with the further selected transmission mode.

8. The method as claimed in claim 1, wherein the first communication device transmits the first list of transmission modes to the data link control via a signaling message intended for the second communication device, wherein the data link control delays forwarding of the signaling message and transmits the first and second lists to the quality-of-service device, and wherein the initiating of the further selection of the transmission mode by the data link control comprises;
modifying, by the data link control, the delayed signaling message after the data link control receives the at least one transmission mode selected by the quality-of-service device such that the transmission modes of the signaling message are replaced by at least a portion of the at least one transmission mode selected by the quality-of-service device, and
transmitting, by the data link control, the modified signaling message to the second communication device.

9. A communication system for selecting a transmission mode for transmitting payload data between a first communication device and a second communication device over a packet-oriented communication network, wherein a quality of service of the transmission of payload data is dependent on the transmission mode to be used for transmitting the payload data, the system comprising:
a quality-of-service device for: receiving a first list of transmission modes supported by the first communication device, receiving a second list of transmission modes supported by the second communication device, the second list generated independently of the first list, selecting one or more transmission modes from the first and second lists on the basis of available transmission resources of the communication network such that the quality of service dependent on the selected one or more transmission modes is guaranteed by available transmission resources, and transmitting the selected one or more transmission modes to a data link control, the quality-of-service device not being either of the first and second communication devices and not being a component of either of the first and second communication devices; and
the data link control for initiating a further selection of a transmission mode from the one or more transmission modes for the first and second communication devices selected by and transmitted by the quality-of-service device, the data link control not being one of the first and second communication devices, not being a component of either of the first and second communication devices, not being a component of the quality-of-service device, and not being the quality-of-service device; and
the data link control configured to transmit the further selected transmission mode to the quality-of-service device prior to a start of the transmitting of the payload data between the first and second communication devices using the transmission mode selected in the further selection, and
the quality-of-service device requesting a bandwidth reservation in accordance with the further selected transmission mode;
a transmission device for transmitting the payload data between the first and second communication devices using the transmission mode selected via the further selection;
wherein the at least one transmission mode selected by the quality-of-service device is supported by both the first and second communication devices, and
wherein the further selection initiated by the data link control comprises the data link control performing the further selection of the transmission mode by communicating the further selection of the transmission mode by the data link control to the first and second communication devices such that the transmitting of the payload data between the first and second communication devices using the transmission mode selected in the further selection is performed without the data link control querying the first and second communication devices to make the further selection.

10. The system of claim 9, wherein the data link control is a network node, a gateway or a gatekeeper.

11. The method of claim 1, wherein the data link control is a network node, a gateway or a gatekeeper.

12. The method of claim 1, comprising:
transmitting the first list of transmission modes to the data link control by the first communication device;
transmitting the second list of transmission modes to the data link control by the second communication device prior to the first list of transmission modes being transmitted to the data link control by the first communication device; and
wherein the data link control transmits the first and second lists of the transmission modes to the quality-of-service device.

13. The method of claim 12, wherein the first and second lists are modified by the data link control and merged into a single list for transmission of the first and second lists to the quality-of-service device.

14. The method of claim 13, wherein the first list identifies codecs supported by the first communication device and the second list identifies codecs supported by the second communication device.

* * * * *